United States Patent
Sun et al.

(10) Patent No.: US 11,332,619 B2
(45) Date of Patent: May 17, 2022

(54) WOOD-BASED BIOMIMETIC ARTIFICIAL MUSCLE AND PREPARATION METHOD AND APPLICATION THEREOF

(71) Applicant: ZHEJIANG A & F UNIVERSITY, Hangzhou (CN)

(72) Inventors: Qingfeng Sun, Hangzhou (CN); Baokang Dang, Hangzhou (CN); Chao Wang, Hangzhou (CN); Zhe Wang, Hangzhou (CN); Caicai Li, Hangzhou (CN)

(73) Assignee: ZHEJIANG A & F UNIVERSITY, Hangzhou (CN)

( * ) Notice: Subject to any disclaimer, the term of this patent is extended or adjusted under 35 U.S.C. 154(b) by 9 days.

(21) Appl. No.: 16/852,578

(22) Filed: Apr. 20, 2020

(65) Prior Publication Data
US 2020/0407561 A1 Dec. 31, 2020

(51) Int. Cl.
*C08L 97/02* (2006.01)
*B27K 5/00* (2006.01)
(Continued)

(52) U.S. Cl.
CPC .............. *C08L 97/02* (2013.01); *B27K 3/153* (2013.01); *B27K 5/0005* (2013.01); *C08L 33/02* (2013.01); *C08L 2205/03* (2013.01)

(58) Field of Classification Search
CPC ....... C08L 97/02; C08L 33/02; B27K 3/0207; B27K 3/15; B27K 3/153
See application file for complete search history.

(56) References Cited

U.S. PATENT DOCUMENTS

| | | | | |
|---|---|---|---|---|
| 4,737,491 A | * | 4/1988 | Leppavuori | B27K 3/15 106/15.05 |
| 2009/0011214 A1 | * | 1/2009 | Wang | B27K 3/15 428/305.5 |
| 2015/0174785 A1 | * | 6/2015 | Qu | B27K 3/007 428/308.8 |

FOREIGN PATENT DOCUMENTS

WO WO-2019055789 A1 * 3/2019 ........... B27K 3/0278

OTHER PUBLICATIONS

Huseyin Yorur & Kadir Kayahan, "Improving Impregnation and Penetration Properties of Refractory Woods Through Cryogenic Treatment," 13 BioResources 1829 (2018).*

* cited by examiner

*Primary Examiner* — Nicholas E Hill (57) ABSTRACT

The invention relates to a wood-based biomimetic artificial muscle and preparation method and application thereof. The biomimetic artificial muscle comprises a wood-based cellulose skeleton, and polyvinyl alcohol and at least one ionic polymer filled in the wood-based cellulose skeleton. The preparation method includes S1: slicing wood, and subjecting the obtained wood slices to ammonia treatment and delignification in sequence; S2: soaking in the solution of citric acid and/or citrate; S3: preparing water solution of an ionic polymer and DMSO water solution of polyvinyl alcohol separately, and mixing to obtain polymer solution; S4: subjecting the treated wood slices to vacuum treatment, filling the polymer solution into the container, releasing vacuum, and pressurizing to infiltrate the polymer into the wood slices until saturation; S5: freezing the wood slices in a refrigerator and thawing; and S6: repeating S5 for 5-10 times, washing the wood slices, and drying. The inventive biomimetic artificial muscle obtained by physical crosslinking not only has the same elasticity and electrostriction as (Continued)

the polymer, but also maintains the strength of the wood-based skeleton.

2 Claims, 7 Drawing Sheets

(51) Int. Cl.
*C08L 33/02* (2006.01)
*B27K 3/15* (2006.01)

WOOD-BASED BIOMIMETIC ARTIFICIAL MUSCLE AND PREPARATION METHOD AND APPLICATION THEREOF

RELATED APPLICATION

This application claims the benefit of the Chinese Patent Application CN1201910554628.9 filed Jun. 25, 2019, which is incorporated herein by reference in its entirety.

FIELD OF THE INVENTION

The present invention relates to the technical field of biomimetic muscles, in particular to a wood-based biomimetic artificial muscle and preparation method and application thereof.

BACKGROUND OF THE INVENTION

Muscles are biologically contractible tissues with functions of information transmission, energy transfer, waste elimination, energy supply, motion transfer and self-repair. It has long been a focus in the field of mechanical engineering to realize high efficiency and high flexibility in engineering designs by simulating the motions of living bodies. Since most of various motions of the living bodies are achieved by muscle contracting and stretching, artificial muscles have become one of the hot fields in the scientific research. Similar to the muscle tissues of the living bodies, the artificial muscle features a bending or contracting motion under the action of an external electrical stimulus to output a certain force while generating the deformation. When the artificial muscle is arranged at a moving machine joint, it can realize a given action or complete a corresponding task in cooperation with a control module. The artificial muscle is important in research on intelligent manufacturing and biomimetic robots, and can help realize light-weighted and flexible robots.

A conventional artificial muscle is usually implemented by deformable elastic chambers into which fluid is injected by a pneumatic or hydraulic device to expand or contract them, and various motion forms such as bending, winding and stretching can be achieved through the rational design of a spatial position relationship among the chambers, in cooperation with valve flow passages and gas pumps or liquid pumps. Although such a design of the artificial muscle features high driving force and can realize a complex shape and structure, it fails to be fully flexible, needs a large number of rigid components such as gas pumps, pipes and valves, and is large in size due to its chamber structure and thus, undesired on some miniature-device-demanding occasions.

In additional to the conventional artificial muscles, it is one of the new research interests to realize electrodeformation based on material properties. It is found through research that a class of elastic polymer materials can convert electric energy into mechanical energy by change in the internal structures of the materials under electrostimulation, to thereby incur mechanically responsive behaviors such as stretching and bending. As a result, the materials are named as electroactive polymers.

The electroactive polymers are categorized into two groups, namely electronic electroactive polymers and ionic electroactive polymers. The electronic electroactive polymer, also known as an electric field driven active material, has its molecular chains induced for rearrangement under the action of electrostatic force in the electric field to incur an electrostrictive effect as well as electrostatic, piezoelectric and ferroelectric effects, and can undergo an induced displacement under the action of a DC electric field. Such a material usually requires a high excitation electric field ($>100$ V/$\mu$m) close to a breakdown electric field. However, the ionic electroactive polymer is driven to deform by ion migration in the polymer, usually requires a relatively low voltage and high current, has relatively low energy efficiency and needs continuous energy to maintain its shape.

A preparation method of wood hydrogel (Muscle-Inspired Highly Anisotropic, Strong, Ion-Conductive Hydrogels DOI: 10.1002/adma.201801934) is currently reported and includes delignifying wood with $NaClO_2$ solution having a pH value of 4.6, soaking the wood in 40 wt % acrylamide solution (containing initiator APS with a monomer content of 1.25 wt % and chemical crosslinker MBA with a monomer content of 1 wt %) 20 mL, vacuum degassing, releasing vacuum every other 10 min to allow the acrylamide solution to infiltrate into the wood, degassing, and reacting at 60° C. for 2 h in an oven. The inventor of the present invention discovers the following disadvantages of this preparation method: (1) sodium hypochlorite with the pH value of 4.6 for delignification may generate hypochlorous acid, under an acidic condition, which will interact with the hydroxyl groups of cellulose to generate a hypochlorite ester, and the hypochlorite ester may lose part of hydrogen chloride under the action of $OH^-$ ions and turn into aldehyde or ketone, thereby affecting the cellulose bond stability; furthermore, large amounts of chlorine gas, harmful to human bodies, will escape as a result of sodium hypochlorite bleaching under the acidic condition; (2) the amounts of the initiator and the crosslinker added during the polymerization process of acrylamide monomers will affect the polymerization degree of acrylamide; in case of ammonium persulfate as initiator, a high initiation speed may cause incomplete polymerization of acrylamide, and at the same time, non-fully-reacted small molecular substances will affect hydrogen bonding of the polymer and cellulose; and if the crosslinker disperses nonuniformly in the internal structure of wood, acrylamide will fail to crosslink completely.

OBJECTS AND SUMMARY OF THE INVENTION

In view of the defects in prior arts, the invention aims to provide a wood-based biomimetic artificial muscle and preparation method and application thereof. The wood-based biomimetic artificial muscle is prepared from an electrostrictive polymer and a high-strength wood-based skeleton to thereby achieve good bending deformation.

According to a first aspect, the invention provides a wood-based biomimetic artificial muscle. The biomimetic artificial muscle comprises a wood-based cellulose skeleton, and polyvinyl alcohol and at least one ionic polymer filled in the wood-based cellulose skeleton.

According to the wood-based biomimetic artificial muscle provided by the invention, the wood-based cellulose skeleton involves wood fibers having lignin and hemicellulose removed therefrom.

According to the wood-based biomimetic artificial muscle provided by the invention, the wood-based cellulose skeleton may come from a variety of common wood, preferably from poplar, birch, cork wood and/or pine.

According to the wood-based biomimetic artificial muscle provided by the invention, the molecular weight of polyvinyl alcohol may be 27,000-205,000, preferably 67,000-145,000.

According to the wood-based biomimetic artificial muscle provided by the invention, the ionic polymer is selected from polyacrylic acid, polymethacrylic acid, sodium polyacrylate and/or sodium polymethacrylate. Preferably, the molecular weight of polyacrylic acid, polymethacrylic acid, sodium polyacrylate or sodium polymethacrylate is 2,000-125,000.

According to the wood-based biomimetic artificial muscle provided by the invention, the mass ratio of the wood-based cellulose skeleton to polyvinyl alcohol is 100:10-20. Preferably, the mass ratio of the wood-based cellulose skeleton to the ionic polymer is 100:20-40.

According to the wood-based biomimetic artificial muscle provided by the invention, the wood-based cellulose skeleton further comprises citric acid and/or citrate in a preferred embodiment. Through abundant experimental studies, the inventor unexpectedly discovers that delignification where lignin and hemicellulose are removed from fixed positions in wood leads to collapse in part of the cellulose skeleton, and after treatment with citric acid or citrate, the structural stability of the cellulose skeleton is improved by dehydration of two carboxyl groups of citric acid to form anhydride which further undergoes esterification crosslinking with the hydroxyl groups in the molecular chain of cellulose to form an ester bond, thereby remarkably improving the mechanical performance of the wood-based cellulose skeleton.

Preferably, the mass ratio of the wood-based cellulose skeleton to the total of citric and citrate is 100:5-10. The citrate is trisodium citrate in a preferred embodiment.

The wood-based biomimetic artificial muscle provided by the invention mainly comprises a cellulose skeleton, polyvinyl alcohol and an ionic polymer (such as polyacrylic acid) to form a 3D structure. The skeletal muscle tissues have a highly ordered nanocomposite structure and anisotropic mechanical properties and are basically composed of muscle fibers each comprising highly-oriented densely-arranged myofibrils. A cross-bridge system composed of ordered myosin and actin filaments in the myofibrils plays a role in energy transfer and contraction of the muscle fibers. The muscle fibers can make an active contraction in response to electrostimulation and chemical stimulation to generate an active force, and are connected with each other via microfiber net tissues. The muscle fibers in the muscle tissues have a tensile strength and modulus of 0.1 MPa and 121 MPa, respectively, along the fiber direction. Wood, however, is a natural porous limited-expansion colloidal material belonging to a natural polymer gel material. It has a multilayer composite structure composed of cellulose, lignin and hemicellulose ranging from microcells to nanofibers. The anisotropic wood cells result in the anisotropic elasticity and deformation behavior of the wood. Since cellulose has no chain folding but only a few defects, it is high in strength (about 10 GPa) and modulus (about 150 GPa). There exist nanogaps in the cellulose skeleton left when lignin and hemicellulose are removed from the wood, so that polyvinyl alcohol and the ionic polymer (such as polyacrylic acid) therein can play the same role in energy transfer and contracting motion as the actin and myosin filaments.

According to a second aspect, the invention provides a preparation method of wood-based biomimetic artificial muscle, and the preparation method includes:

Step S1: slicing wood, and subjecting the obtained wood slices to ammonia treatment and delignification in sequence;

Step S2: soaking in the solution of citric acid and/or citrate;

Step S3: preparing water solution of an ionic polymer and dimethyl sulfoxide (DMSO) water solution of polyvinyl alcohol separately, and mixing to obtain polymer solution;

Step S4: subjecting the treated wood slices to vacuum treatment in a container, filling the polymer solution into the container, releasing vacuum, and pressurizing to infiltrate the polymer into the wood slices until saturation;

Step S5: freezing the wood slices in a refrigerator and thawing;

Step S6: repeating Step S5 for 5-10 times, washing the wood slices, and drying.

According to the preparation method of wood-based biomimetic artificial muscle provided by the invention, the wood in Step S1 can be a variety of common wood, preferably poplar, birch, cork wood and/or pine.

According to the preparation method of wood-based biomimetic artificial muscle provided by the invention, the ammonia treatment specifically includes soaking the wood slices in 10-25 wt % ammonia water for 5-60 min.

According to the preparation method of wood-based biomimetic artificial muscle provided by the invention, the delignification in Step S1 may include boiling the wood slices in sodium hydroxide-sodium sulfite water solution at 85-100° C. for 2-4 h, and washing in deionized water, wherein the concentration of sodium hydroxide is 0.01-5 mol/L and that of sodium sulfite is 0.01-3 mol/L.

According to the preparation method of wood-based biomimetic artificial muscle provided by the invention, in Step S2, preferably, the citrate is trisodium citrate, the soaking temperature is 25-50° C., and the soaking time is 1-60 min; and the total of citric acid and citrate accounts for 1-10 wt % of the solution of citric acid and/or citrate.

According to the preparation method of wood-based biomimetic artificial muscle provided by the invention, in Step S3, the water solution of an ionic polymer is preferably 10-60 wt % polyacrylic acid water solution, polymethacrylic acid water solution, sodium polyacrylate water solution or sodium polymethacrylate water solution; and polyvinyl alcohol accounts for 10-60 wt % of the DMSO water solution of polyvinyl alcohol.

According to the preparation method of wood-based biomimetic artificial muscle provided by the invention, preferably, the DMSO water solution of polyvinyl alcohol is prepared by adding polyvinyl alcohol as solute into 20-50 wt % DMSO water solution as solvent, and standing in a water bath at 70-90° C. until polyvinyl alcohol is fully dissolved.

According to the preparation method of wood-based biomimetic artificial muscle provided by the invention, in Step S3, the volume ratio of the water solution of an ionic polymer to the DMSO water solution of polyvinyl alcohol is 1-6:1, preferably 2-4:1.

According to the preparation method of wood-based biomimetic artificial muscle provided by the invention, in Step S4, the vacuum treatment may include treating under 0.6-0.8 MPa for 1 min-1 h, holding for 1-20 min after vacuum release, pressurizing to 0.6-3 MPa and holding the pressure for 10 min-6 h.

According to the preparation method of wood-based biomimetic artificial muscle provided by the invention, in Step S5, the freezing temperature may range from −60° C. to −5° C., the freezing time may last for 10-20 h, and the thawing time may last for 6-10 h.

According to the preparation method of wood-based biomimetic artificial muscle provided by the invention, in Step S6, the washing may include washing by soaking in distilled water for 3-5 times, and the drying may include drying at 45-60° C. for 10-24 h.

The preparation method of wood-based biomimetic artificial muscle provided by the invention has the following innovations:

(1) The shortcomings concerning wood delignification in prior arts are solved in Step S1 by ammonia treatment where wood is softened and plastified, so that ammonia water infiltrates into the wood to react with lignin, tannic acid or other chromophores, to facilitate delignification with alkaline solution entering the wood in a subsequent process.

(2) The problem concerning the stability of the cellulose skeleton in the delignified wood slice is solved in Step S2. The delignification where lignin and hemicellulose are removed from fixed positions in the wood leads to collapse in part of the cellulose skeleton; however, after treatment with citric acid, the structural stability of the cellulose skeleton is improved by dehydration of two carboxyl groups of citric acid to form anhydride which further undergoes esterification crosslinking with the hydroxyl groups in the molecular chain of cellulose to form an ester bond, thereby remarkably improving the mechanical performance of the wood-based cellulose skeleton.

(3) In Step S3 solved is the problem concerning interference of non-fully-reacted small molecular substances with the combination between the polymer and the wood. The invention adopts a cyclic freezing-thawing process where polyvinyl alcohol (PVA) and an ionic polymer (such as polyacrylic acid, PAA) are subjected to a direct physical crosslinking to form a hydrogen bond to be associated with the hydrogen bond of the wood cellulose. In the freezing process, PVA can form microcrystals which mainly play the role in crosslinking.

(4) The problems concerning the solubility of PVA and crosslinking in the freezing-thawing process are solved in Step S3 by dissolving PVA with DMSO water solution. The DMSO water solution can improve the solubility of PVA so that PVA is fully dispersed in the solvent while avoiding agglomeration of PVA dissolved in water. Meanwhile, the DMSO water solution helps PVA form the microcrystals at a low temperature to facilitate crosslinking with the polymer.

According to a third aspect, the invention provides a biomimetic robot, which comprises machine joints, artificial muscles and a control module. The artificial muscle is a wood-based biomimetic artificial muscle comprising a wood-based cellulose skeleton, and PVA and at least one ionic polymer filled in the wood-based cellulose skeleton.

The inventive wood-based biomimetic artificial muscle and preparation method thereof have the following advantages:

(1) In the preparation method of wood-based biomimetic artificial muscle, wood is delignified before a polymer is pressurized under vacuum to infiltrate into the wood, and a cyclic freezing-thawing process is adopted for physical crosslinking between the wood and the polymer to thereby obtain the biomimetic artificial muscle.

(2) The cyclic freezing-thawing process requires no initiator or crosslinker, but simply physical crosslinking to obtain the biomimetic artificial muscle which not only has the same elasticity and electrostriction as the polymer, but also maintains the strength of the wood-based skeleton.

(3) An electric field response test on the inventive wood-based biomimetic artificial muscle shows that it has a good bending deformation behavior.

BRIEF DESCRIPTION OF FIGURES

Hereinafter, a brief introduction to the drawings required in the specific embodiments of the present invention or the description of prior arts is given, in order to clearly illustrate the specific embodiments or the technical solutions in prior arts. In all the drawings, similar elements or parts are generally marked by similar reference numerals. Each element or part is not necessarily drawn to its actual scale in the drawings.

DETAILED DESCRIPTION OF THE EMBODIMENTS

It should be noted that, unless otherwise specified, the technical or scientific terms used in this application should receive the ordinary meanings understood by those skilled in the art of the invention.

The ionic polymers mainly comprise electrolyte polymers, carbon nanocomposites, ionic polymers and electroconductive polymers. Examples of the ionic polymers and the electroconductive polymers are highlighted in the embodiments.

The electroconductive polymers are formed from polymers having conjugated $\pi$ bonds by chemical or electrochemical doping, and have electrical conductivity ranging from insulator to conductor. Under electrochemical stimulation, the electroconductive polymers structurally expand in an oxidation state and contract upon change into random coils in a reduction state, thereby realizing their motions and actions under the large deformation.

The ionic polymers undergo local swelling and contraction due to the migrating motions of the polymer ions and electrolyte ions in an electric field environment to change the ion concentration inside the polymers, thereby driving the materials to deform.

The embodiments of the invention provide a preparation method of wood-based biomimetic artificial muscle, including:

Step S1: slicing wood, and subjecting the obtained wood slices to ammonia treatment and delignification in sequence.

The wood can be selected from poplar, birch, cork wood or pine, and the wood slices with even lengths, smooth cuts and uniform thicknesses can be obtained in the slicing process.

The ammonia treatment specifically includes soaking the wood slices in 10-25% ammonia water for 5-60 min.

The ammonia treatment realizes softening of the wood slices which have lost their surface and internal moisture due to standing for long time, to thereby facilitate the subsequent delignification.

Lignin is an amorphous aromatic polymer widely found in plants and containing oxophenylpropanol or its derivative structural units in its molecular structure. It is one of the components forming the cell walls of plant and plays the role in connecting cells. In order to make the polymer well infiltrate into the wood subsequently, the invention adopts delignification to provide a sufficient space for the polymer, so that the wood and the polymer are well combined together.

The delignification process in the embodiments of the invention employs alkaline solution and specifically includes boiling the wood slices in sodium hydroxide-sodium sulfite water solution at 85-100° C. for 2-4 h, and washing in deionized water, wherein the concentration of sodium hydroxide is 0.01-5 mol/L and that of sodium sulfite is 0.01-3 mol/L.

Step S2: soaking the wood slices in citric acid solution or citrate (trisodium citrate) solution at 25-50° C. for 1-60 min.

Generally, wood comprises cellulose 40-50%, hemicellulose 10-30% and lignin 20-30%. The delignified wood slices may undergo a decline in strength, so the invention has the wood slices soaked in citric acid or citrate to affect the movement of cellulose and hemicellulose molecular chains, thereby strengthening the skeleton structure inside the molecules, remarkably improving the mechanical properties and stability of the wood slices and reducing moisture absorption.

The citric acid or citrate accounts for 1-10 wt % of the citric acid solution or citrate solution.

Step S3: preparing ionic polymer solution and DMSO water solution of PVA separately, and mixing to obtain polymer solution.

The ionic polymer solution is 10-60 wt % PAA water solution, sodium polyacrylate water solution or sodium polymethacrylate water solution containing purified water or distilled water as solvent.

The mass fraction of the DMSO water solution of PVA is 10-60%.

The DMSO water solution of PVA is prepared by adding PVA as solute into 20-50 wt % DMSO water solution as solvent, and standing in a water bath container at 70-90° C. until PVA is fully dissolved.

In Step S3, the volume ratio of the ionic polymer solution to the DMSO water solution of PVA is 2-4:1.

The ionic polymer is premixed with PVA in the embodiments of the invention, so that PVA will uniformly infiltrate into the wood in the subsequent impregnation process to thereby improve the mechanical properties of the whole wood slices.

Step S4: subjecting the treated wood slices to vacuum treatment under 0.6-0.8 MPa for 1 min-1 h in a container, filling the polymer solution obtained in Step S3 into the container, releasing vacuum, and pressurizing to infiltrate the polymer into the wood slices until saturation.

In Step S4, the pressure is increased to 0.6-3 MPa 1-20 min after vacuum release, and held for 10 min-6 h.

Whether the wood is saturated with the polymer or not is determined by the volume expanding situation of the wood.

Step S5: freezing the wood slices at −60−−5° C. in a refrigerator for 12 h and thawing at a room temperature for 6-10 h.

Step S6: repeating Step S5 for 5-10 times, washing the wood slices, and drying at 45-60° C. for 10-24 h.

The washing is performed by soaking in distilled water for 3-5 times

The invention adopts the cyclic freezing-thawing process with no initiator or crosslinker but simply physical crosslinking to obtain the biomimetic artificial muscle, which not only has the same elasticity and electrostriction as the polymer, but also maintains the strength of the wood-based skeleton.

When applied with an electric field, the wood-based biomimetic artificial muscle prepared by the invention has its swelling balance in electrolyte solution so broken that free ions in the artificial muscle move away from electrodes against the friction within the artificial muscle and at the artificial muscle interface. At the same time, the fixed charge position of the polymer chain is relatively stable, and the uniform distribution of ions is disturbed due to the movement of the free ions. Thus, an ion gradient is formed between the electrodes and affects the uniform structure and mechanical properties of the artificial muscle, which further induces the swelling pressure to move towards a nonequilibrium state of the electric field. As a result, the swelling pressure of the positive electrode in the artificial muscle is higher than that of the negative electrode, so that the artificial muscle is bent towards the negative electrode.

Hereinafter, embodiments of the invention will be illustrated in details in conjunction with the accompanying drawings. The following embodiments are only used to clearly illustrate the technical solution of the invention, and therefore are merely examples, and should not be used to limit the protection scope of the invention.

The molecular weight of PAA used in the following embodiments is about 5,000, and that of PVA is about 67,000.

Example 1

S1: slicing poplar, soaking the obtained wood slices in 25% ammonia water for 5 min, boiling in sodium hydroxide-sodium sulfite water solution at 100° C. for 2 h, and washing in deionized water, wherein the concentration of sodium hydroxide is 5 mol/L and that of sodium sulfite is 3 mol/L.

S2: soaking the wood slices in 1 wt % citric acid solution at 50° C. for 60 min.

S3: preparing 60 wt % PAA water solution.

PVA as solute is added into 50 wt % DMSO water solution as solvent and then fully dissolved via a water bath container at 70° C., wherein the mass fraction of PVA in the DMSO water solution is 60%.

The PAA water solution is mixed with the DMSO water solution of PVA at a volume ratio of 2:1 to obtain polymer solution.

S4: subjecting the wood slices to vacuum treatment under 0.6 MPa for 30 min in a container, filling the polymer solution in the container, releasing the vacuum, holding for 10 min, pressurizing to 3 MPa and holding the pressure for 10 min until the wood is saturated with the polymer.

S5: freezing the wood slices at −60° C. in a refrigerator for 12 h, and thawing at a room temperature for 10 h.

S6: repeating the step S5 for 10 times, soaking the wood slices in distilled water to wash for 5 times, and drying at 60° C. for 12 h to obtain the wood-based biomimetic artificial muscle.

Figure 1:
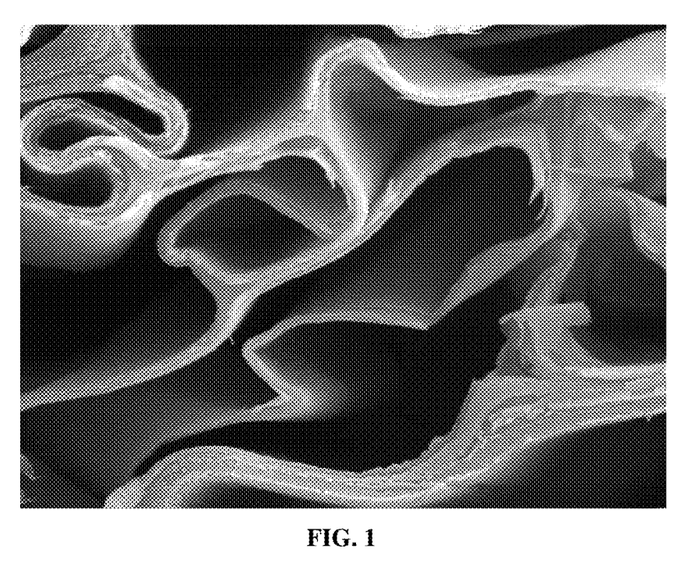
FIG. 1 is an electron micrograph of the delignified wood slice obtained in Step S1 of the method for preparing a wood-based biomimetic artificial muscle provided in Example 1 of the present invention.
Figure 2:
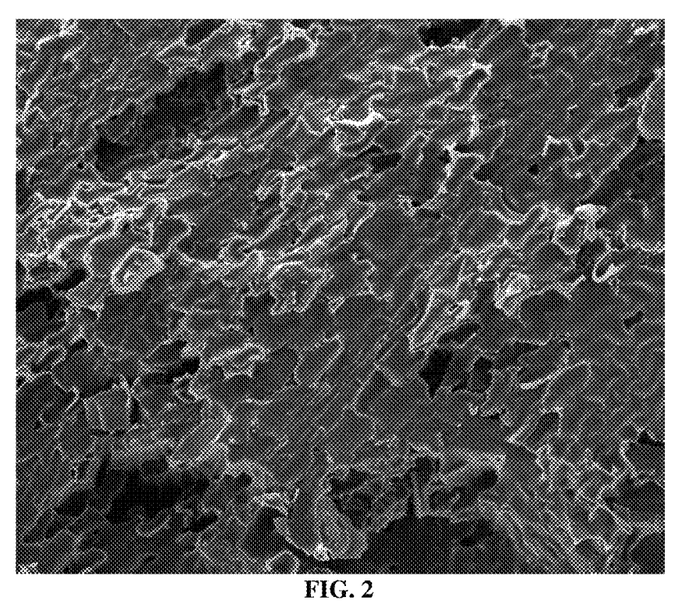
FIG. 2 is an electron micrograph of the biomimetic artificial muscle obtained in Step S6 of the method for preparing a wood-based biomimetic artificial muscle provided in Example 1 of the present invention.

FIG. 1 is an electron micrograph of a delignified wood slice obtained in Step S1 of the method for preparing a wood-based biomimetic artificial muscle provided in Example 1 of the present invention; FIG. 2 is an electron micrograph of the biomimetic artificial muscle obtained in Step S6 of the method for preparing a wood-based biomimetic artificial muscle provided in Example 1 of the present invention. With reference to FIG. 1 and FIG. 2, it can be seen that PVA and PAA fully infiltrate into the wood slices and are well linked with them after repeated freezing and thawing.

Figure 3:
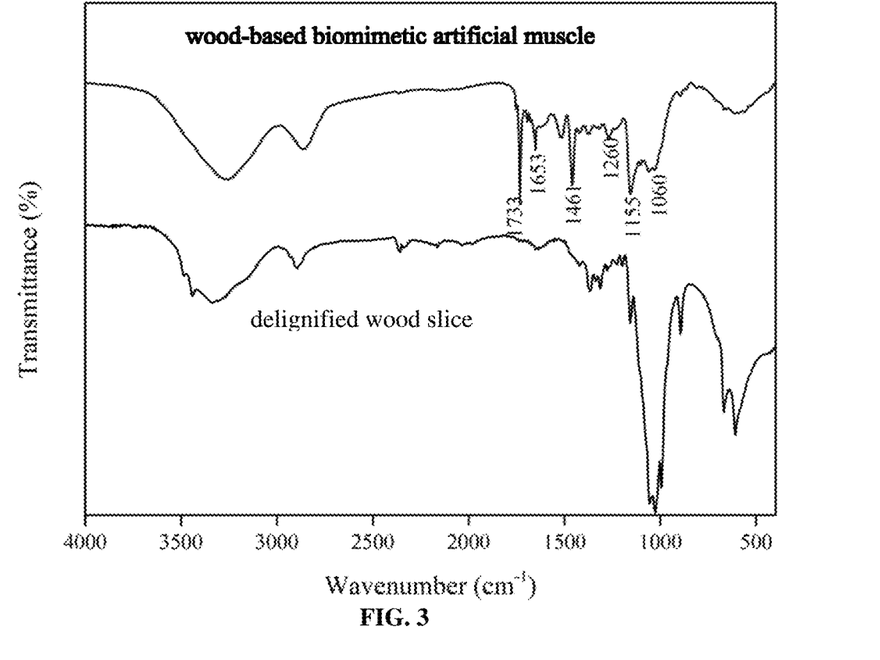
FIG. 3 is an infrared spectrum comparison chart between the delignified wood slice obtained in Step S1 and the wood-based biomimetic artificial muscle obtained in Step S6 in Example 1.

FIG. 3 is an infrared spectrum comparison chart between the delignified wood slice obtained in Step S1 and the wood-based biomimetic artificial muscle obtained in Step S6 in Example 1.

With reference to FIG. 3, the absorption peak of the hydroxyl groups of the delignified wood slice is at 3410 $cm^{-1}$, while that of the wood-based biomimetic artificial muscle is at 3345 $cm^{-1}$. Such a movement of the absorption peak to the low wavenumber means that the hydroxyl groups of PVA molecules, those in the wood slices and the carboxyl or carboxyl derivative groups of the ionic polymer form strong hydrogen bonds during the combination process of the polymer and the wood slices. Compared with the infrared spectrum of the delignified wood slices, in the infrared spectrum of the wood-based biomimetic artificial muscle derived from the carboxyl groups of PAA, C=O stretching vibration occurs at 1705 $cm^{-1}$, the peak at 1461 $cm^{-1}$ results from —$CH_2$ vibration, and C—OH stretching vibration at 1060-1155 $cm^{-1}$ gets enhanced, because of PVA. All these chemical bond changes indicate that PVA and PAA are combined on the delignified wood slices, and these formed hydrogen bonds play the role of physical crosslinking in the wood-based biomimetic artificial muscle, to thereby form the wood-based biomimetic artificial muscle with good strength.

Example 2

S1: slicing cork wood, soaking the obtained wood slices in 20% ammonia water for 40 min, boiling in sodium hydroxide-sodium sulfite water solution at 85° C. for 2.5 h, and washing in deionized water, wherein the concentration of sodium hydroxide is 4 mol/L and that of sodium sulfite is 2 mol/L.

S2: soaking the wood slices in 2 wt % citric acid solution at 40° C. for 40 min.

S3: preparing 30 wt % sodium polyacrylate water solution.

PVA as solute is added into 30 wt % DMSO water solution as solvent and then fully dissolved via a water bath container at 80° C., wherein the mass fraction of PVA in the DMSO water solution is 30%.

The sodium polyacrylate water solution is mixed with the DMSO water solution of PVA at a volume ratio of 3:1 to obtain polymer solution.

S4: subjecting the wood slices to vacuum treatment under 0.8 MPa for 1 min in a container, filling the polymer solution in the container, releasing the vacuum, holding for 20 min, pressurizing to 2 MPa and holding the pressure for 1 h until the wood is saturated with the polymer.

S5: freezing the wood slices in a refrigerator at −38° C. for 12 h, and thawing at a room temperature for 8 h.

S6: repeating the step S5 for 10 times, soaking the wood slices in distilled water to wash for 3 times, and drying at 50° C. for 12 h to obtain the wood-based biomimetic artificial muscle.

Example 3

S1: slicing pine, soaking the obtained wood slices in 15% ammonia water for 30 min, boiling in sodium hydroxide-sodium sulfite water solution at 90° C. for 3 h, and washing in deionized water, wherein the concentration of sodium hydroxide is 1 mol/L and that of sodium sulfite is 1 mol/L.

S2: soaking the wood slices in 5 wt % trisodium citrate solution at 25° C. for 30 min.

S3: preparing 20 wt % sodium polymethacrylate water solution.

PVA as solute is added into 25 wt % DMSO water solution as solvent and then fully dissolved via a water bath container at 80° C., wherein the mass fraction of PVA in the DMSO water solution is 30%.

The sodium polymethacrylate water solution is mixed with the DMSO water solution of PVA at a volume ratio of 2:1 to obtain polymer solution.

S4: subjecting the wood slices to vacuum treatment under 0.8 MPa for 1 h in a container, filling the polymer solution in the container, releasing the vacuum, holding for 1 min, pressurizing to 1 MPa and holding the pressure for 3 h until the wood is saturated with the polymer.

S5: freezing the wood slices in a refrigerator at −20° C. for 12 h, and thawing at a room temperature for 7 h.

S6: repeating the step S5 for 8 times, soaking the wood slices in distilled water to wash for 4 times, and drying at 60° C. for 12 h to obtain the wood-based biomimetic artificial muscle.

Example 4

S1: slicing birch, soaking the obtained wood slices in 10% ammonia water for 60 min, boiling in sodium hydroxide-sodium sulfite water solution at 95° C. for 4 h, and washing in deionized water, wherein the concentration of sodium hydroxide is 0.01 mol/L and that of sodium sulfite is 0.01 mol/L.

S2: soaking the wood slices in 10 wt % trisodium citrate solution at 50° C. for 1 min.

S3: preparing 10 wt % polymethacrylic acid water solution.

PVA as solute is added into 20 wt % DMSO water solution as solvent and then fully dissolved via a water bath container at 90° C., wherein the mass fraction of PVA in the DMSO water solution is 10%.

The polymethacrylic acid water solution is mixed with the DMSO water solution of PVA at a volume ratio of 4:1 to obtain polymer solution.

S4: subjecting the wood slices to vacuum treatment under 0.7 MPa for 10 min in a container, filling the polymer solution in the container, releasing the vacuum, holding for 10 min, pressurizing to 0.6 MPa and holding the pressure for 6 h until the wood is saturated with the polymer.

S5: freezing the wood slices in a refrigerator at −5° C. for 12 h, and thawing at a room temperature for 6 h.

S6: repeating the step S5 for 5 times, soaking the wood slices in distilled water to wash for 5 times, and drying at 45° C. for 12 h to obtain the wood-based biomimetic artificial muscle.

Electric Field Response Test on Wood-Based Biomimetic Artificial Muscles

The biomimetic artificial muscle prepared in Example 1 is cut into a shape with a length of 30 mm and a width of 5 mm, then soaked in deionized water and finally fixed between two graphite electrodes of a test device. The distance between the graphite electrodes is adjustable, and the test device is loaded with 2 wt % sodium sulfate solution and externally connected with a DC voltage and current stabilized power source. When the electric field intensity is adjusted as required, the power switch is turned on to record the bending conditions of the artificial muscle in different electric fields.

Figure 4:
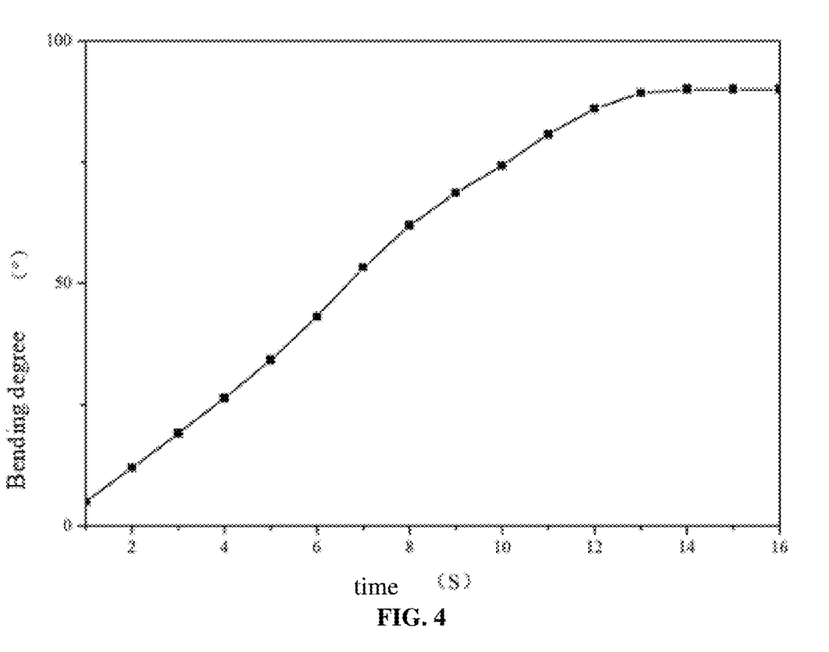
FIG. 4 is a bending state diagram of an artificial muscle varying over time under the condition of an electric field intensity of 10 V/cm.

FIG. 4 is a bending state diagram of an artificial muscle varying over time under the condition of an electric field intensity of 10 V/cm. With reference to FIG. 4, it can be seen that the artificial muscle gradually deflects over time until its bending angle reaches 90 degrees, which takes 14 s.

Figure 5:
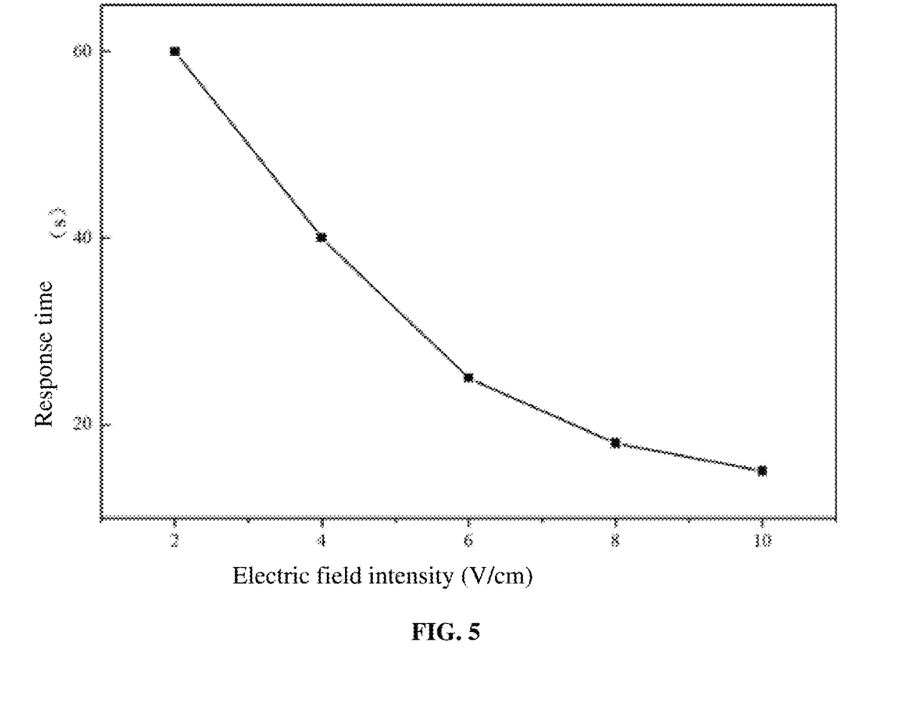
FIG. 5 is a state diagram of the bending angle of an artificial muscle changing with electric field intensity.

FIG. 5 is a state diagram of the bending angle of an artificial muscle changing with electric field intensity. With reference to FIG. 5, the time for the artificial muscle to bend to 90 degrees gradually decreases along with the increase in the electric field intensity.

Mechanical Strength Test on Wood-Based Biomimetic Artificial Muscles

The wood-based artificial muscles prepared in Examples 1-4 are cut into a shape with a length of 40 mm, width of 5 mm and thickness of 2 mm separately, to obtain five samples for each example, and a test on tensile strength is carried out by use of a miniature mechanical test machine.

Figure 6:
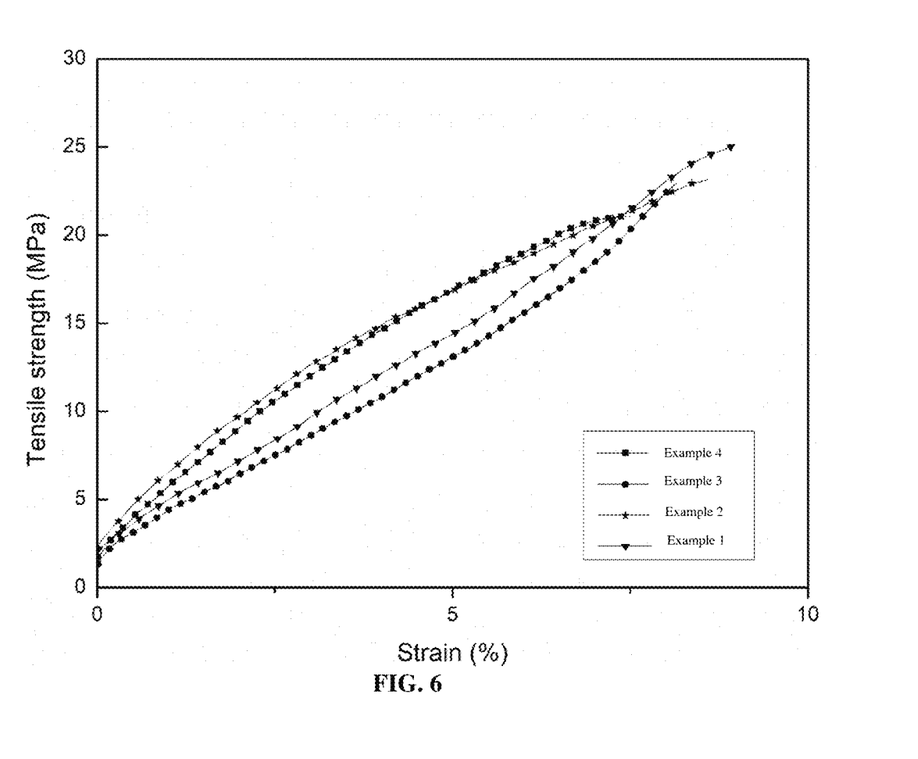
FIG. 6 is a stress-strain curve diagram of a wood-based biomimetic artificial muscle prepared in Examples 1-4 of the present invention.
Figure 7:
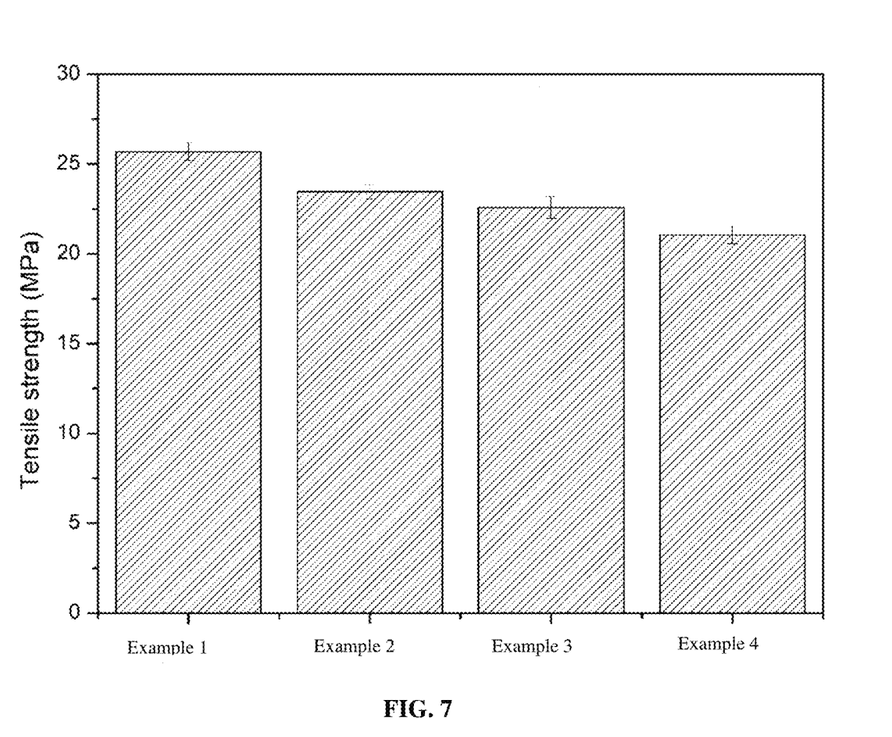
FIG. 7 is a tensile strength comparison diagram of a wood-based biomimetic artificial muscle prepared in Examples 1-4 of the present invention.

FIG. 6 and FIG. 7 are tensile property diagrams of the wood-based artificial muscles in Examples 1-4. The strengths of the wood-based muscles in Examples 1 and 2 are 25.68 and 23.45, respectively. Such a difference mainly arises from the wood variety and, more specifically, poplar has higher strength than cork wood. In addition, the ratio of sodium polyacrylate to PVA in Example 2 is 3:1. In the artificial muscle of the present invention, it is the wood and PVA that play the role in enhancing the mechanical strength. As a result, the tensile strength in Example 1 is higher than that in Example 2. Likewise, the ratio of sodium polyacrylate to PVA in Example 4 is 4:1, so the tensile strength in Example 4 is the lowest.

Unless otherwise stated specifically, the numerical values elaborated in these embodiments do not limit the scope of the present invention. In all the examples shown and described herein, any specific value, unless otherwise specified, should be construed as exemplary only, but not as a limitation. Therefore, other examples of the exemplary embodiments may have different values.

Finally, it should be noted that the above embodiments are only used to illustrate the technical solution of the present invention, but not limited thereto. Although the present invention has been described in detail with reference to the foregoing embodiments, those skilled in the art should understand that modifications can be made on the technical solutions recorded in the foregoing embodiments, or equivalent replacements can be made on some or all of the technical features. These modifications or replacements do not make the essence of the corresponding technical solutions deviate from the scope of the technical solutions of the embodiments of the present invention, and should be covered by the scope of the claims and the specification of the present invention.

What is claimed is:

1. A preparation method of wood-based biomimetic artificial muscles, including the following steps:
    Step S1: slicing wood, and subjecting the obtained wood slices to ammonia treatment and delignification in sequence;
    Step S2: soaking the wood slices in S1 in a solution of citric acid and/or citrate;
    Step S3: preparing a water solution of an ionic polymer and preparing a dimethyl sulfoxide water solution of polyvinyl alcohol separately, and mixing the two solutions to obtain a polymer solution;
    Step S4: subjecting the wood slices in S2 and to vacuum treatment in a container, filling the polymer solution into the container, releasing vacuum, and pressurizing to infiltrate the polymer into the wood slices until saturation;
    Step S5: freezing the wood slices in S4 in a refrigerator and thawing; and
    Step S6: repeating Step S5 for 5-10 times, washing the wood slices and drying, wherein:
    the ammonia treatment in Step S1 includes soaking the wood slices in 10-25 wt % ammonia water for 5-60 minutes;
    the delignification treatment in Step S1 includes boiling the wood slices in a sodium hydroxide-sodium sulfite water solution at 85-100° C. for 2-4 hours, and washing in deionized water;
    the concentration of sodium hydroxide is 0.01-5 mol/L and the concentration of sodium sulfite is 0.01-3 mol/L;
    in Step S2, the citrate is trisodium citrate, the soaking temperature is 25-50° C., the soaking time is 1-60 minutes, and the total of citric acid and citrate accounts for 1-10 wt % of the solution of citric acid and/or citrate;
    the water solution of the ionic polymer in Step S3 is 10-60 wt % polyacrylic acid water solution, 10-60 wt % polymethacrylic acid water solution, 10-60 wt % sodium polyacrylate water solution or 10-60 wt % sodium polymethacrylate water solution;
    the mass fraction of polyvinyl alcohol in the dimethyl sulfoxide water solution of polyvinyl alcohol is 10-60%;
    the dimethyl sulfoxide water solution of polyvinyl alcohol is prepared by adding polyvinyl alcohol as solute into 20-50 wt % dimethyl sulfoxide water solution as solvent, and standing in a water bath at 70-90° C. until polyvinyl alcohol is fully dissolved;
    in Step S3, the volume ratio of the water solution of the ionic polymer to the dimethyl sulfoxide water solution of polyvinyl alcohol is 2-4:1;
    in Step S4, the vacuum treatment includes treating under 0.6-0.8 MPa for 1 minute-1 hour, holding for 1-20 minutes after vacuum release, pressurizing to 0.6-3 MPa and holding the pressure for 10 minutes-6 hours; and
    in Step S5, the freezing temperature ranges from −60° C. to −5° C., the freezing time lasts for 10-20 hours, and the thawing time lasts for 6-10 hours.

2. The method in claim 1, wherein the wood in Step S1 is poplar, birch, cork wood and/or pine.

* * * * *